Patented June 11, 1946

2,402,020

UNITED STATES PATENT OFFICE 2,402,020

VULCANIZED SYNTHETIC ELASTOMER AND PROCESS OF MAKING IT

Francis E. Cislak and William H. Rieger, Indianapolis, Ind., assignors to Reilly Tar & Chemical Corporation, Indianapolis, Ind., a corporation of Indiana No Drawing. Application July 14, 1942, Serial No. 450,920

2 Claims. (Cl. 260—86.5)

1

This invention relates to vulcanized synthetic elastomers, commonly called synthetic rubber, and the process of making them.

It is the object of this invention to produce new vulcanized synthetic elastomers, of desirable properties; and to do so by simple and effective synthesizing methods.

We obtain these objects by our present invention.

We have found that new vulcanized synthetic elastomers, possessing valuable and highly desirable properties, can be produced simply and relatively economically by copolymerizing, most effectively in aqueous emulsion, a mixture of butadiene-1,3 (which we shall hereinafter call simply butadiene) and one or more monovinylpyridines (which we shall hereinafter call simply vinylpyridines). Among the vinylpyridines which may be used are 2-vinylpyridine, 4-vinylpyridine, and various alkyl vinylpyridines, such for instance as 2-methyl-6-vinylpyridine.

The product thus obtained is a rubber-like co-polymer containing pyridine rings.

Although it is not necessary, the co-polymerization involving the butadiene and the vinylpyridine may if desired include other compounds that are co-polymerizable with butadiene and vinylpyridines and enter into that co-polymerization reaction, such for instance as styrene and acrylonitrile; and for some purposes it is desirable to have such other components enter into the co-polymerization in addition to the butadiene and the vinylpyridine. This is included in the broad invention of this application.

The ratio of vinylpyridine or vinylpyridines to the butadiene, and to other components of the polymerization if they are used, may vary widely, depending upon the properties desired. Generally speaking, more springy materials result when this ratio is low, and stiffness increases as the ratio is raised.

In a preferred way of carrying out our invention, we produce an aqueous emulsion for the co-polymerization; and may obtain that aqueous emulsion by passing butadiene, in either gaseous or liquid phase, into a mixture of water or ice and the vinylpyridine, and agitating. Although under some conditions, as when the butadiene is liquid, the mixing of the butadiene with the other ingredients may be done in an open vessel, the agitation is best done in a closed vessel. The agitation can be and desirably is carried on at room temperature, and while it is being carried on both emulsification and co-polymerization occur; so that these two actions may be regarded

2 as a single technical operation. The agitation is continued sufficiently long for the necessary co-polymerization to take place; which at room temperature ordinarily requires several days.

It is desirable to have an emulsifying agent present, to facilitate the emulsification; and to have a polymerization catalyst present to facilitate the co-polymerization. Suitable emulsification agents are salts of organic bases of high molecular weight and salts of organic acids of high molecular weight; sodium oleate, or even ordinary soap, is most effective. Among the suitable polymerization catalysts are the peroxides, such for instance as hydrogen peroxide, acetyl peroxide, and benzoyl peroxide.

Upon the co-polymerization in the aqueous emulsion, the co-polymerization product is produced in latex-like form. In this form it is a co-polymer of butadiene and vinylpyridine in aqueous emulsion. It may be used in this form. Commonly, however, it is desirable to obtain it in massive form. This may be done by coagulating the latex, separating the coagulum, washing, and drying. The coagulation may conveniently be effected by adding acetic acid to the latex, or by other suitable coagulation procedure; and the washing and drying may be effected in the usual manner of washing and drying rubber and rubber-like coagulums, as by passing the coagulum through heated rolls provided with a water-spraying device. The coagulum thus obtained is a rubber-like co-polymer containing pyridine rings—a co-polymer of butadiene and vinylpyridine.

The following examples illustrate our invention:

*Example 1*

Fifty parts (by weight) of 2-vinylpyridine, 50 parts of butadiene, 75–150 parts of a 10% aqueous solution of sodium oleate, and 0.75 to 1.25 parts of benzoyl peroxide, are mixed together, and the mixture is agitated in a closed vessel for four to seven days at room temperature. A latex-like product results. This latex-like product is coagulated by the addition of two parts of acetic acid; whereupon the coagulum produced is separated, washed free from soluble salts on a roller mill, and then dried. This gives a rubber-like product—an elastomer—in nearly quantitative yields.

The co-polymerization procedure is capable of considerable variation. For instance: instead of carrying it out at room temperature, we may use moderately elevated temperatures, such for instance as 50°–60° C., although for convenience we prefer to use room temperature; instead of sodium oleate other suitable emulsifying agents may be used, such as ordinary soap, salts of organic bases of high molecular weight, and salts of organic acids of high molecular weight; and instead of benzoyl peroxide, other polymerization catalysts may be used, such as acetyl peroxide and hydrogen peroxide.

The rubber-like product, or elastomer, obtained by the foregoing procedure, may be compounded in various ways, depending upon the use to which it is to be put; and may and commonly desirably is vulcanized. One suitable mix for compounding and vulcanizing may have the following composition:

| Ingredients | Parts |
|---|---|
| The elastomer as above obtained | 100 |
| Carbon black | 50 |
| Stearic acid | 2 |
| Magnesium oxide | 10 |
| Diphenylguanidine | 1 |
| Sulfur | 2 |

This mix may be suitably vulcanized, say for an hour at 150° C.

The vulcanizate thus obtained is a "springy rubber" of good strength and extensibility, and is not affected by petroleum solvents.

The nature of the vulcanizate can be varied by varying the vulcanization mixture. For instance, the sulfur may be varied in amount, or even omitted; the carbon black may be varied in amount, or omitted; various vulcanizing accelerators may be used in place of the diphenylguanidine, such for instance as mercaptobenzthiazole or dibenzothiazyldisulfide; zinc oxide may be used in place of or in addition to the magnesium oxide; etc.; as is well understood by vulcanizers.

Example 2

Seventy-five parts (by weight) of 2-vinylpyridine, 25 parts of butadiene, 100 parts of a 10% aqueous solution of sodium oleate, and one part of benzoyl peroxide, are mixed together, and the mixture is agitated in a closed vessel for about four to six days. A latex-like product results, as in Example 1. This latex-like product is coagulated, washed free from soluble salts, and then dried. The dried material thus obtained is tough, and rubber-like; but it is less springy than the product of Example 1.

The rubber-like product, or elastomer, as obtained in this Example 2, may be compounded and vulcanized as in the case of the elastomer of Example 1.

Example 3

Example 1 is repeated, save that 4-vinylpyridine is used in place of 2-vinylpyridine. A rubber-like product, or elastomer, is obtained, as in Example 1; and apparently has higher tensile strength than has the product obtained in Example 1.

The elastomer obtained in Example 3 may also be compounded and vulcanized, as in Example 1.

Example 4

Example 2 may be similarly repeated, with 4-vinylpyridine used instead of 2-vinylpyridine.

Example 5

Examples 1 and 2 are repeated, save that 2-methyl-6-vinylpyridine is used in place of 2-vinylpyridine. This yields rubber-like products, or elastomers, which appear to be more "springy" than are the products of Examples 1 and 2, which are made with 2-vinylpyridine.

The elastomers obtained when 2-methyl-6-vinylpyridine is used may be compounded and vulcanized in the manner set forth in Example 1.

Example 6

Twenty-five parts (by weight) of 2-vinylpyridine, 25 parts of styrene, 50 parts of butadiene, 100–150 parts of a 10% solution of sodium oleate, and 1 part of benzoyl peroxide, are mixed together, and the mixture is agitated in a closed vessel for about five days at room temperature. A latex-like product results, as in previous examples; and that may be coagulated, and washed and dried, to produce a rubber-like material or elastomer, as in Example 1. But this rubber-like material, or elastomer, as obtained by this Example 6, using three components (2-vinylpyridine, styrene, and butadiene) in the co-polymerization mixture, seems to be tougher than is the product of Example 1, obtained from a two-component co-polymerization mixture.

The rubber-like product or elastomer obtained by this Example 6 may be compounded and vulcanized as in earlier examples, and gives a vulcanizate of good strength.

The products obtained by our invention, as exemplified in Examples 1 to 6 inclusive, are compatible with natural rubber and with various other synthetic elastomers. In addition, they have certain advantageous properties over natural rubber, such for instance as the property of not being affected by petroleum solvents.

We claim as our invention:

1. The process of producing a co-polymer, which consists in co-polymerizing 75 parts of 2-vinylpyridine and 25 parts of butadiene-1,3 in an aqueous solution of sodium oleate in the presence of a peroxide polymerization catalyst.

2. A sulfur vulcanizate of the co-polymer of 2-vinylpyridine and butadiene-1,3 produced by the process set forth in claim 1.

FRANCIS E. CISLAK.
WILLIAM H. RIEGER.